US009275625B2

(12) United States Patent  
Kim et al.

(10) Patent No.: US 9,275,625 B2
(45) Date of Patent: Mar. 1, 2016

(54) CONTENT BASED NOISE SUPPRESSION

(71) Applicant: QUALCOMM Incorporated, San Diego, CA (US)

(72) Inventors: Lae-Hoon Kim, San Diego, CA (US); Asif Iqbal Mohammad, San Diego, CA (US); Erik Visser, San Diego, CA (US); Jongwon Shin, Gwangju (KR)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 13/787,605

(22) Filed: Mar. 6, 2013

(65) Prior Publication Data

US 2014/0254816 A1 Sep. 11, 2014

(51) Int. Cl.
A61F 11/06 (2006.01)
G10K 11/16 (2006.01)
H04M 9/08 (2006.01)
G10L 21/0216 (2013.01)

(52) U.S. Cl.
CPC ............ G10K 11/16 (2013.01); G10L 21/0216 (2013.01); H04M 9/082 (2013.01)

(58) Field of Classification Search
USPC ....................................................... 381/71.11
See application file for complete search history.

(56) References Cited

U.S. PATENT DOCUMENTS

2009/0012786 A1 1/2009 Zhang et al.
2009/0030654 A1 1/2009 Koike et al.
2009/0034750 A1 2/2009 Ayoub et al.
2010/0211693 A1 8/2010 Master et al.
2012/0052872 A1 3/2012 Do
2012/0078397 A1 3/2012 Lee et al.
2012/0177213 A1 7/2012 Le

FOREIGN PATENT DOCUMENTS

WO WO 02/11123 * 4/2002
WO WO-2007007916 A1 1/2007

OTHER PUBLICATIONS

International Search Report and Written Opinion—PCT/US2014/017381—ISA/EPO—May 14, 2014.
Alexander A., et al., "Music and Noise Fingerprinting and Reference Cancellation Applied to Forensic Audio Enhancement", AES 46th International Conference, Jun. 2012, pp. 1-7.

\* cited by examiner

Primary Examiner — Quynh Nguyen
(74) Attorney, Agent, or Firm — Knobbe Martens Olson & Bear, LLP

(57) ABSTRACT

Apparatus and methods for audio noise attenuation are disclosed. An audio signal analyzer can determine whether an input audio signal received from a microphone device includes a noise signal having identifiable content. If there is a noise signal having identifiable content, a content source is accessed to obtain a copy of the noise signal. An audio canceller can generate a processed audio signal, having an attenuated noise signal, based on comparing the copy of the noise signal to the input audio signal. Additionally or alternatively, data may be communicated on a communication channel to a separate media device to receive at least a portion of the copy of the noise signal from the separate media device, or to receive content-identification data corresponding to the content source.

20 Claims, 9 Drawing Sheets

CONTENT BASED NOISE SUPPRESSION

FIELD

The following description is directed to audio signal processing. In particular, the description is directed to audio noise suppression.

BACKGROUND

Personal devices have become increasingly mobile, powerful, and connected due, in part, to advances in battery, processing, and communication technologies. As these technologies advance, users have more flexibility in the ways they may use and interact with their devices. In particular, a mobile device may use voice recognition to allow users to control the mobile device with voice commands. Furthermore, for voice recognition as well as voice telemetry, users want the mobile device to operate normally in variety of environments, including acoustically-harsh environments.

Various noise suppression schemes have been used to reduce or mitigate the deleterious effects of background noise as a user is interacting with a mobile device. Frequency selective filtering, for instance, can be used to suppress noises associated with certain frequency bands. Other noise suppression schemes use statistical models to suppress certain aspects of the captured audio signal that are statistically related to noise or that are statistically unrelated to the intended audio signal. Yet other noise suppression schemes use internal signals to cancel noise resulting from sound produced and then sensed (for example, echo noise) by the mobile device.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include reducing background noises to improve audio processing.

One embodiment is a device to attenuate audio noise. The device can include a microphone configured to receive an input audio signal. The device can also include an audio signal analyzer configured to determine if the input audio signal includes a noise signal having identifiable content. If there is a noise signal having identifiable content, the audio signal analyzer can access a content source to obtain a copy of the noise signal. The device can also include an audio canceller configured to generate a processed audio signal having an attenuated noise signal based on comparing the copy of the noise signal to the input audio signal.

Another embodiment is a method to attenuate audio noise. The method can include receiving an input audio signal. The method can also include determining if the input audio signal includes a noise signal having identifiable content. If there is a noise signal having identifiable content, the method can include accessing a content source to obtain a copy of the noise signal. The method can further include generating a processed audio signal having an attenuated noise signal based on comparing the copy of the noise signal to the input audio signal.

Still another embodiment is a non-transitory, computer-readable medium storing instructions that, when executed, causes a processor to perform a method. The method includes receiving an input audio signal and determining if the input audio signal includes a noise signal having identifiable content. If there is a noise signal having identifiable content, the method includes accessing a content source to obtain a copy of the noise signal. The method further includes generating a processed audio signal having an attenuated noise signal based on comparing the copy of the noise signal to the input audio signal.

DETAILED DESCRIPTION

Figure 1:
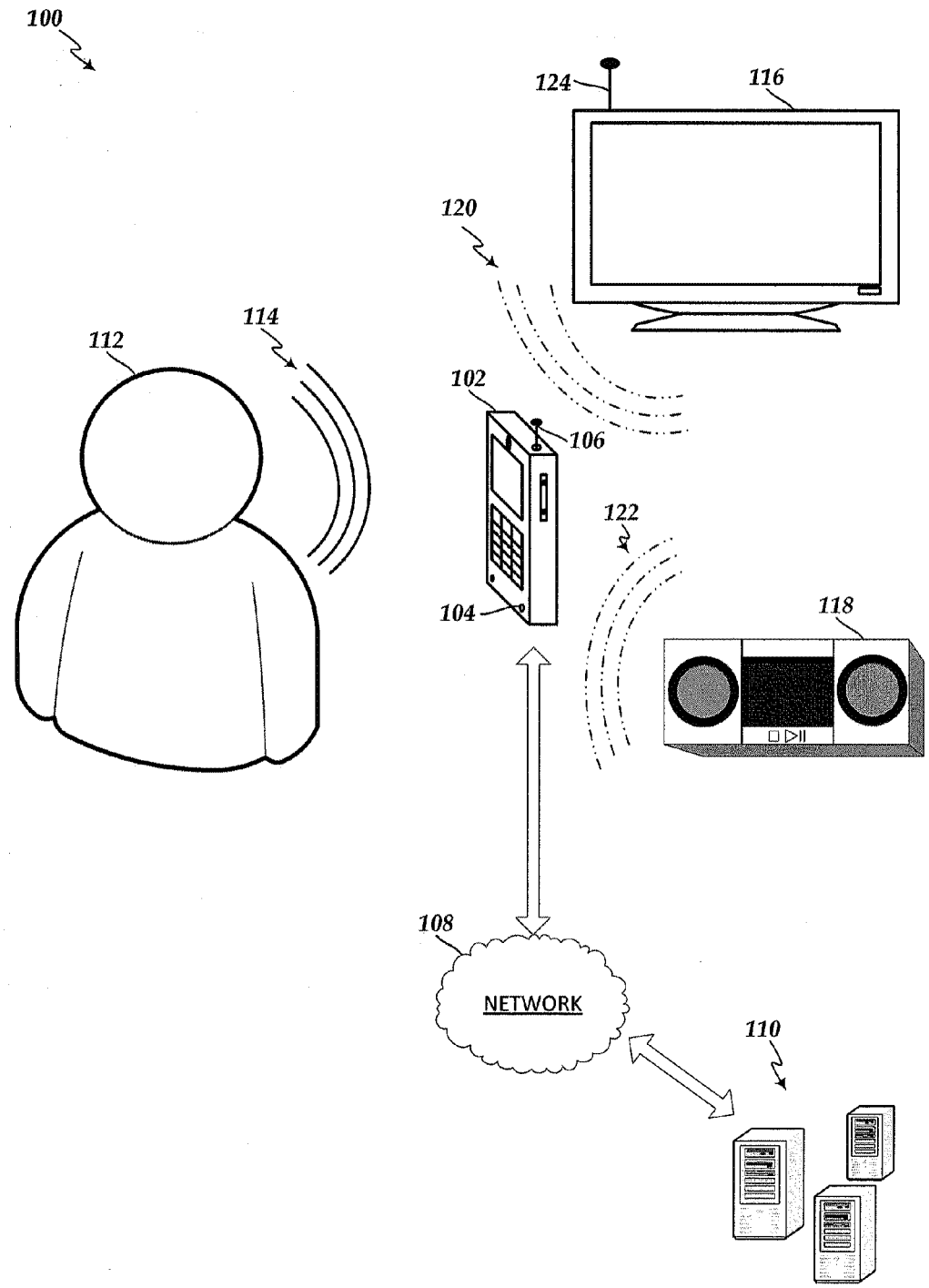
FIG. 1 is a block schematic diagram of an audio system including a mobile phone to suppress noise from one or more media devices according to one embodiment.

Embodiments relate to systems and methods for suppressing unwanted audio noise in an audio signal received by an electronic device. In one embodiment, the system suppresses audio noise representing identifiable media content, such as a popular song being played in the background. The system may obtain a copy of the media content, generate a copy of the unwanted audio noise from the copy of the media content, and remove the unwanted audio noise from the audio signal. For example, in operation the system determines an acoustic pattern or fingerprint of the unwanted audio noise and uses the pattern to identify the media content (for example, a particular song) represented by the audio noise. The identity can be used to search for a media content source, such as a digital recording of the identified song. Once the song is identified, a copy of the song can be downloaded to the electronic device, and then used to subtract out that song from the audio signal. In one embodiment, the system can be implemented by a portable computing device, such as a cellular phone. For example, the cellular phone can suppress songs or other media content playing in the background during a phone conversation.

In one specific example, the system can be implemented by a cellular phone with a microphone and a digital music library stored in a memory of the phone. When the person talks on the phone near a radio playing a particular song, the system can extract audio features from the microphone's audio signal to develop an acoustic pattern or fingerprint of that song. The developed pattern can then be used to search a database containing song identities indexed by such acoustic patterns to find the song being played by the radio. If a song identity matches the pattern, the phone can then search its music library for a copy of the identified song. Alternatively, the phone could request a copy of the identified song from a server over a network connection. Once accessed, the copy of the song can be synchronized to the temporal position of the song as it's played on the radio to suppress the song from the received audio signal. A phone having this system would allow a user to operate a phone in areas that were otherwise too acoustically harsh for telephonic conversations, such as outdoor music venues or concert halls.

In another specific example, the noise suppression system can be implemented by a voice-controlled remote controller that controls a separate media device such as a television (TV) having wireless communication capabilities. The controller may receive content information directly from the TV. For example, the TV can communicate the active channel being displayed to the remote, and the remote can use that information to access the channel's audio through an Internet connection. Alternatively, the TV can send a copy of the broadcast to the remote. The remote can, in turn, use the copy of the broadcast to cancel out the audio produce by the TV. This would allow for voice-controlled electronic devices to function with media devices generating audio.

The disclosed methods, apparatus, and systems may function to improve existing noise suppression techniques. Specifically, in some situations audio noise can be found to be substantially deterministic after estimating and/or identifying the content of the audio noise. By way of illustrating, one such situation is where a prerecorded song is the noise source. In this case, the song can be substantially deterministic if, for example, it is known that a song is being played, what particular song, and the specific timing of the song. If the above content-related information is known or identifiable, a copy of the song or audio signal can be used to attenuate, or cancel, a component of the audio signal corresponding to the song. Suppression of the song in this way may improve the quality of voice recognition or voice communication over the mobile device.

Examples of a media device include a television, radio, laptop/netbook computer, tablet computer, desktop computer, and the like electronic devices configured to play media content, including audio media content. Examples of audio media content include data or signals representing music, video, and other like media having audio.

To further illustrate, FIG. 1 shows a block diagram of a specific audio configuration 100 including a mobile phone 102 that is configured to suppress noise from one or more media devices. In particular, the mobile phone 102 has a microphone 104 and an antenna 106. The mobile phone 102 can communicate voice and data signals to a network 108 or other electronic devices. The network 108 can be a wired or wireless network, and can provide access to one or more content databases 110 storing various content sources, such as music and audio-video data files. In one embodiment, the network is the Internet.

In operation, a user 112 speaks into the microphone 104 of the mobile phone 102 for voice communication and/or voice recognition, for example, to control the mobile phone 102 or to control other electronic devices communicatively coupled to the mobile phone 102. The microphone 104 of the mobile phone 102 captures the user's voice commands 114 to generate an input audio signal. The mobile phone 102, in some situations, may be in close proximity to separate media devices, such as a networked-enabled television (TV) 116 or a radio 118. These devices may produce background sounds 120, 122 that act as unwanted background audio noise with respect to the operation of the mobile phone 102.

For example, the network-enabled TV 116 or the radio 118 can be playing stored or streaming music. The microphone 104 may capture the voice commands 114 from the user 112 contemporaneously with the background sounds produced by the network-enabled TV 116 or the radio 118. Under such circumstances, the sound from the network-enabled TV 116 or the radio 118 may significantly interfere with the user's voice commands 114 and make conversation or voice recognition difficult for the user. Various embodiments are related to suppressing the noise components of the input audio signal.

The mobile phone 102 can suppress the noise signal more specifically if the content of the noise signal can be identified. In one embodiment, the mobile phone 102 analyzes the input audio signal to determine whether the input audio signal has an identifiable content, such as a particular song or audio from a television broadcast. For example, one embodiment determines content-identification information (such as song title, album name, artist name, or the like) by extracting features of the input audio signal, and then searching, downloading, streaming, or otherwise accessing a content source. For example, with reference to FIG. 1, the mobile phone 102 can search the content databases 110 to access the content source, where the content source is determined based on matching the source-identification information. Having access to the content source, the mobile phone 102 can obtain a copy of the audio noise ("source signal"), which can be used to specifically attenuate or suppress the audio noise corresponding to the sound produced by the media devices.

Additionally or alternatively, the mobile phone 102 may communicate, either directly or over the network 108, with the network-enabled TV 116 and/or the radio 118 to identify the content source. For example, the mobile phone 102 may be able to request, for instance, channel information from the network-enabled TV 116, where the network-enabled TV 116 can communicate by using its communication antenna 124. Based on the received channel information, the mobile phone 102 can access a content source from the content databases 110. As another example, the mobile phone 102 can access the content source from a device (not shown) that is broadcasting the media content to the network-enabled TV 116, for example, by tuning to the identified channel. As yet another example, the mobile phone 102 can access the content source from the network-enabled TV 116. In other words, network-enabled TV 116 can transmit or relay the content source directly to the mobile phone 102.

Figure 2:
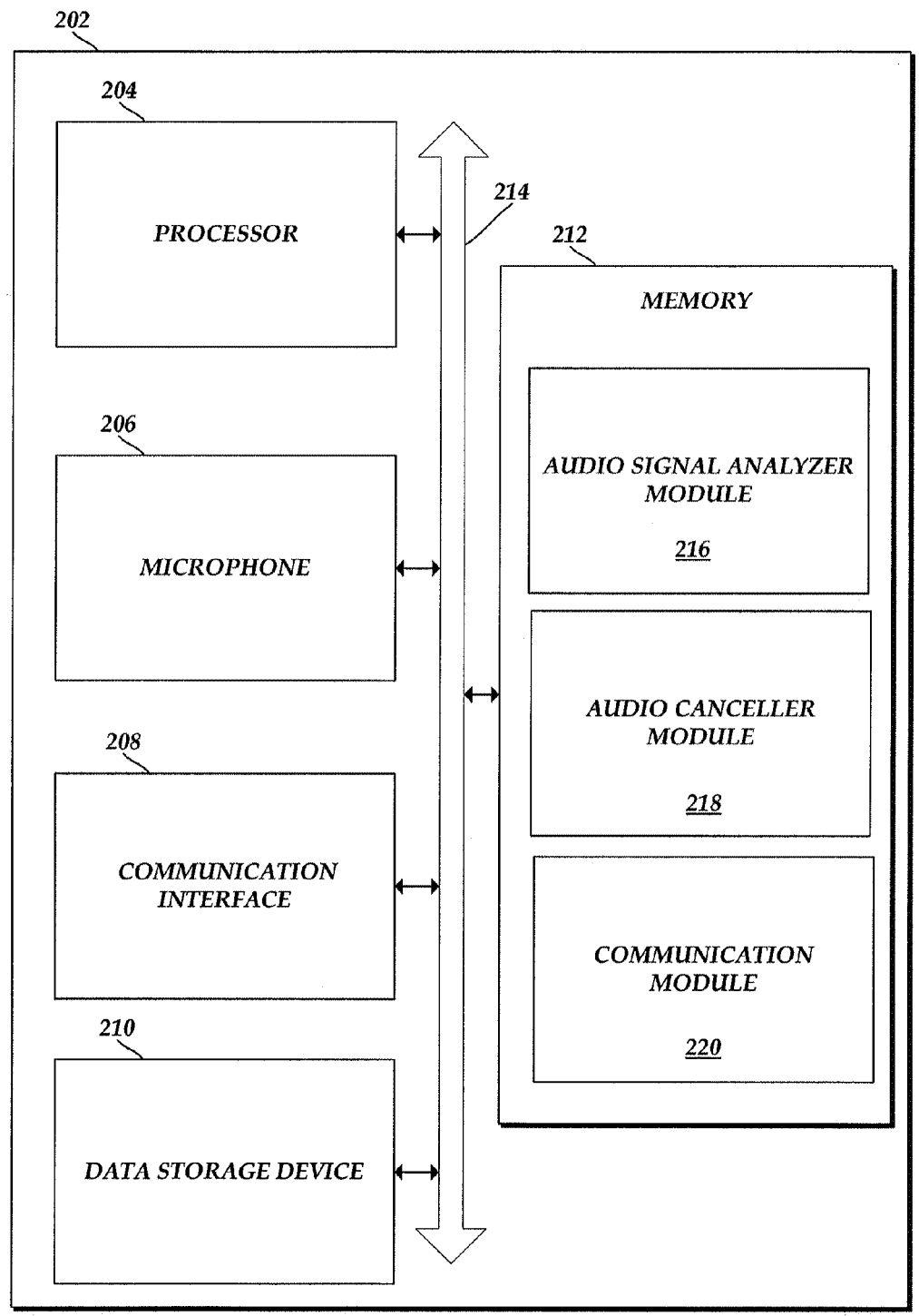
FIG. 2 is a block diagram of an illustrative embodiment of an audio processing device to suppress audio noise.

Now turning to FIG. 2, a block diagram is shown of an illustrative embodiment of an audio processing device 202 that is configured to suppress unwanted audio noise. The audio processing device 202 includes a processor 204, a microphone 206, a communication interface 208, a data storage device 210, and a memory 212 interconnected by a bus 214. Furthermore, the memory 212 can include an audio signal analyzer module 216, an audio canceller module 218, and a communication module 212. Examples of the audio processing device 202 include any applicable electronic device, such as a mobile computing device, cellular phone, general purpose computer, and the like.

The processor 204 includes circuitry, such as a microprocessor or microcontroller, configured to execute instructions from memory 212 and to control and operate the microphone 206, the communication interface 208, the data storage device 210, the memory 212, and the bus 214. In particular, the processor 204 may be a general purpose single- or multi-chip microprocessor (e.g., an ARM), a special purpose microprocessor (e.g., a digital signal processor (DSP)), a microcontroller, a programmable gate array, etc. Although just a single processor is shown in the audio processing device 202, in an alternative configuration, a combination of processors (e.g., an ARM and DSP) could be used.

The microphone 206 is configured to capture acoustic sounds and generate an input audio signal in response, as controlled by the processor 204 executing specific instructions from the memory 212. Examples of the microphone 206 include any applicable sensor or transducer for converting sound into an electrical audio signal, such as condenser microphones, dynamic microphones, piezoelectric microphones, and the like. In some embodiments, the microphone 206 is optional, and an input audio signal is, for example, generated from data from the data storage device 210 or the memory 212, or received from the communication interface 208, as will be discussed below with reference to FIG. 3.

The communication interface 208 includes electronics configured to allow the audio processing device 202 to transmit and receive data, such as data for identifying, retrieving, or accessing the content source. The communication interface 208 can be communicatively coupled to a wireless antenna, WLAN/LAN and other types of routers, and like communication devices.

The data storage device 210 and the memory 212 include mechanisms configured to store information by chemical, magnetic, electrical, optical, or the like means. For instance, the data storage device 210 and memory 212 can each be a non-volatile memory device, such as flash memory or a hard-disk drive, or a volatile memory device, such as dynamic-random access memory (DRAM) or static random-access memory (SRAM). In some embodiments, the processor 204 can access the content source by accessing a content-source database of the data storage device 210. FIG. 2 shows the data storage device 210 as part of the audio processing device 202. In other embodiments, the data storage device 210 may be located on a separate device and accessed by communication channels, for example over a network. The audio signal analyzer module 216 will be discussed in further detail in connection with FIG. 3.

Within the memory 212 is the audio signal analyzer module 216 that includes instructions that configure the processor 204 to initiate identification of a content of the input audio signal, to provide access to a corresponding content source, and/or to receive an identified source signal. As will be discussed in further detail in connection with FIG. 3, in some embodiments features are extracted from the input audio signal. The extracted features can be used to determine a content identity of media content represented by the input audio signal, and the content identity can be used to access a content source associated with the content identity. The audio signal analyzer module 218 will be discussed in further detail in connection with FIGS. 4 and 5.

Within the memory 212 is the audio canceller module 218 that includes instructions that configure the processor 204 to process the input audio signal with the identified source signal to attenuate audio noise. In particular, the input audio signal is compared with the identified source signal. In one embodiment, the identified source signal is filtered to account for room acoustics. One reason that this is done, among others, is because the sound produced by the media device may differ from the identified source signal due, in part, to the acoustical effects of the acoustical space where the electronic device is located. Acoustical effects may include acoustical dampening and echoes. In another embodiment, the input audio signal and the identified source signal are synchronized to account for a various delays resulting from computational, communication, and acoustical factors. The audio canceller module 218 will be discussed in further detail in connection with FIGS. 4 and 5.

Within the memory 212 is the communication module 220 that includes instructions that configure the processor 204 to control the communication interface 208 to transmit or receive data. In some embodiments, communication can be initiated between the audio processing device 202 and a separate media device, such as the network-enabled TV 116 of FIG. 1, as discussed below in further detail.

In operation, the processor 204 can execute instructions from memory 212 to receive an input audio signal captured by the microphone 206. The input audio signal may contain a voice signal and an audio noise signal. For example, the voice signal may represent the user's voice, whereas the audio noise signal may represent sound produced by nearby media devices. The processor 204 may execute instructions from the audio signal analyzer module 216 to identify a content of the audio noise signal. The processor 204 may then search the data storage device 210 for a content source associated with the identified content. Additionally or alternatively, the processor 204 may execute instructions from the audio signal analyzer and/or communication module 212 to search databases over a network via the communication interface 208. Once the audio processing device 202 has access to a content source and has a corresponding identified source signal, the processor 204 may execute instructions from audio canceller module 218 to suppress her attenuate at least part of the audio noise signal by comparing a copy of the noise signal (for example, a filtered or unfiltered identified source signal) to the input audio signal.

Figure 3:
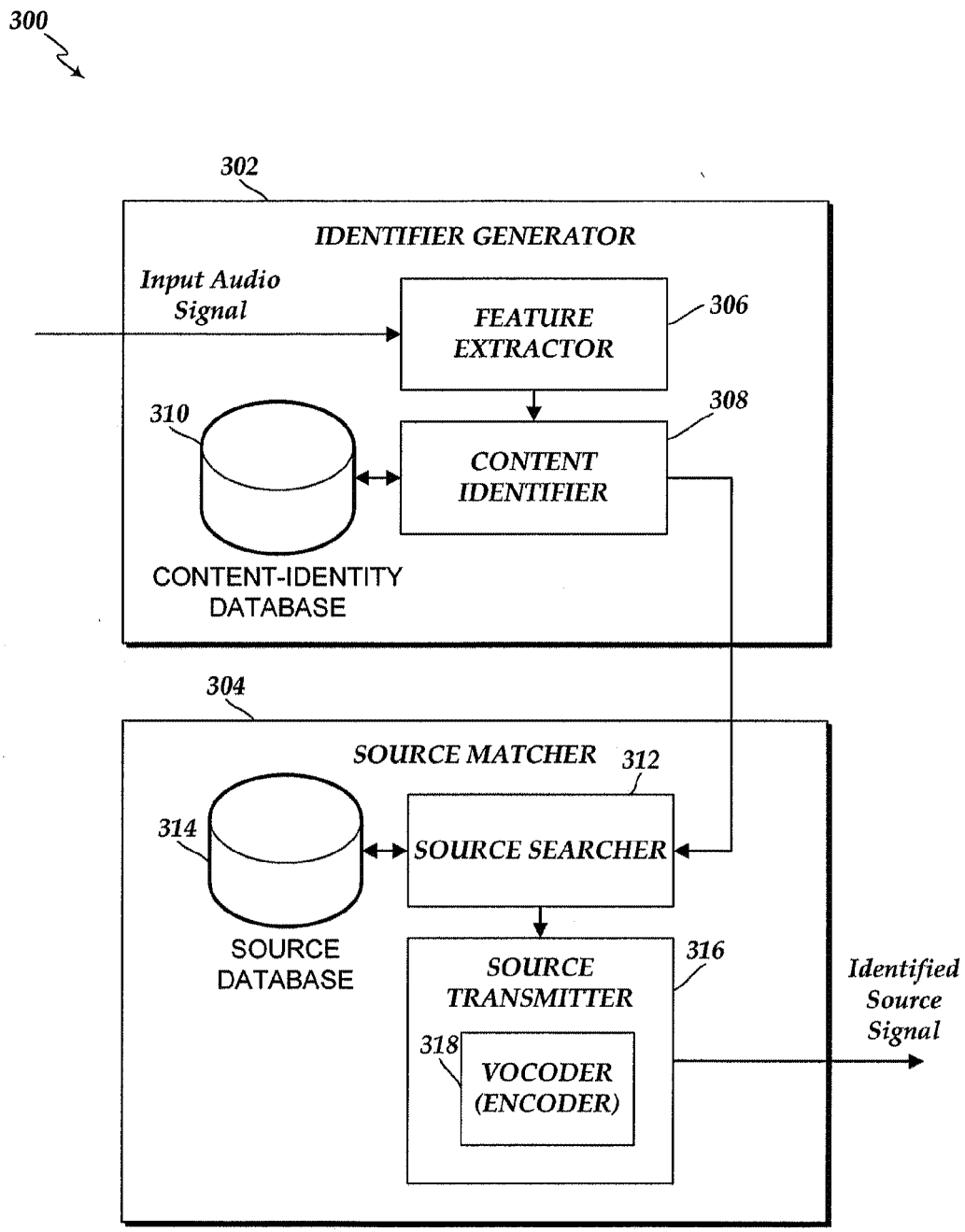
FIG. 3 is a block diagram of a particular illustrative embodiment of an audio signal analyzer implemented by the audio processing device of FIG. 2.

With reference to FIG. 3, a block diagram shows a particular illustrative embodiment of an audio signal analyzer 300 implemented by the audio processing device 202 of FIG. 2. The audio signal analyzer 300 can be implemented with computer executable instructions, such as the instructions of the audio signal analyzer module 216, executed by the processor 204. The audio signal analyzer 300 of FIG. 3 includes an identifier generator 302 configured to receive an input audio signal and to generate content-identification information. The content-identification information can include one or more of the artist's name, the content title (name of song, movie, audiobook, etc.), an identification number, and the like indicia of identity. The audio signal analyzer 300 also has a source matcher 304 that is configured to receive the content-identification information and to generate an identified source signal.

The identifier generator 302 of FIG. 3 has a feature extractor 306, a content identifier 308, and a content-identity database 310. The feature extractor 306 can be implemented by a module including instructions that configure the processor 204 to determine feature information of the input audio signal to determine the content. For example, in operation the feature extractor 306 can analyze the input audio signal to determine an acoustic pattern or fingerprint that can identify or characterize the input audio signal. In one embodiment, the acoustic pattern or fingerprint can be based on performing spectrogram (for example, time-frequency) analysis. It will be appreciated that other applicable methods and systems for feature extraction can be selected, such as audio processing techniques based on Mel-frequency cepstral coefficients and/or perceptual linear prediction (for example, relative spectral transform-perceptual linear prediction). One particular non-limiting example of feature extraction systems for content identification can be found, for example, in the paper "An industrial strength audio search algorithm" (*Proc. Int. Conf on Music Info. Retrieval ISMIR*. Vol. 3. 2003) by Wang. For instance, the system described by Wang utilizes local peak patterns in a spectrogram for improving robustness to background noise.

The content identifier 308 can be implemented by a module including instructions that configure the processor 204 to use the acoustic pattern or fingerprint to search the content-identity database 310 for a content identity of the acoustic pattern or fingerprint. For example, the processor 204 can search the content-identity database 310 for content-identification information that corresponds to, or approximately matches, the acoustic pattern or fingerprint. The identifier generator 302 provides content-identification information to the source matcher 304.

The source matcher 304 of FIG. 3 includes a source searcher 312, a source database 314, and a source transmitter 316. The source searcher 312 can be implemented by a module including instructions that configure the processor 204 to use the content-identification information to search the source database 314 for a content source. For example, the processor 204 can search the source database 314 stored on the data storage device 210 (or stored externally and accessed with the communication interface 208) for a content source such as an MP3 file of a song that corresponds to, or approximately matches, the content-identification information.

The source transmitter 316 can access the content source identified by the source searcher 312 and can generate an identified source signal. The source signal can be transmitted as pulse-code modulation (PCM) audio samples, data packets (including compressed or coded data), or the like data formats. Accordingly, the source transmitter 316 may optionally include a vocoder/encoder 318 to generate coded audio data packets to be transmitted to the audio processing device 202. In other words, the source transmitter 316 can be located at a server computing device, and the source signal can be sent to the audio processing device 202 (such as the mobile phone 102 of FIG. 1) on a data path or a voice path.

It will be appreciated that each of the functions of the audio signal analyzer 300 can be performed by the audio processing device 202 of FIG. 2. In other embodiments, one or more the functions are performed by one or more server computing devices (such as the content databases 110 and other devices connected to the network). For example, the audio processing device 202 can use the communication interface 208 to communicate with a server computer over a network. The identified source signal may be provided over the network in a streaming-like manner its entirety, or in data blocks, in a download-like manner. Thus, the audio processing device 202 may receive portions of the identified source signal before it is needed for canceling. Accordingly, each of the content-identity database 310 and the source database 314 can be stored electronically on the data storage device 210 or the memory 212 of the audio processing device 202, or it can be stored externally to the audio processing device 202 and accessed over a network.

Figure 4:
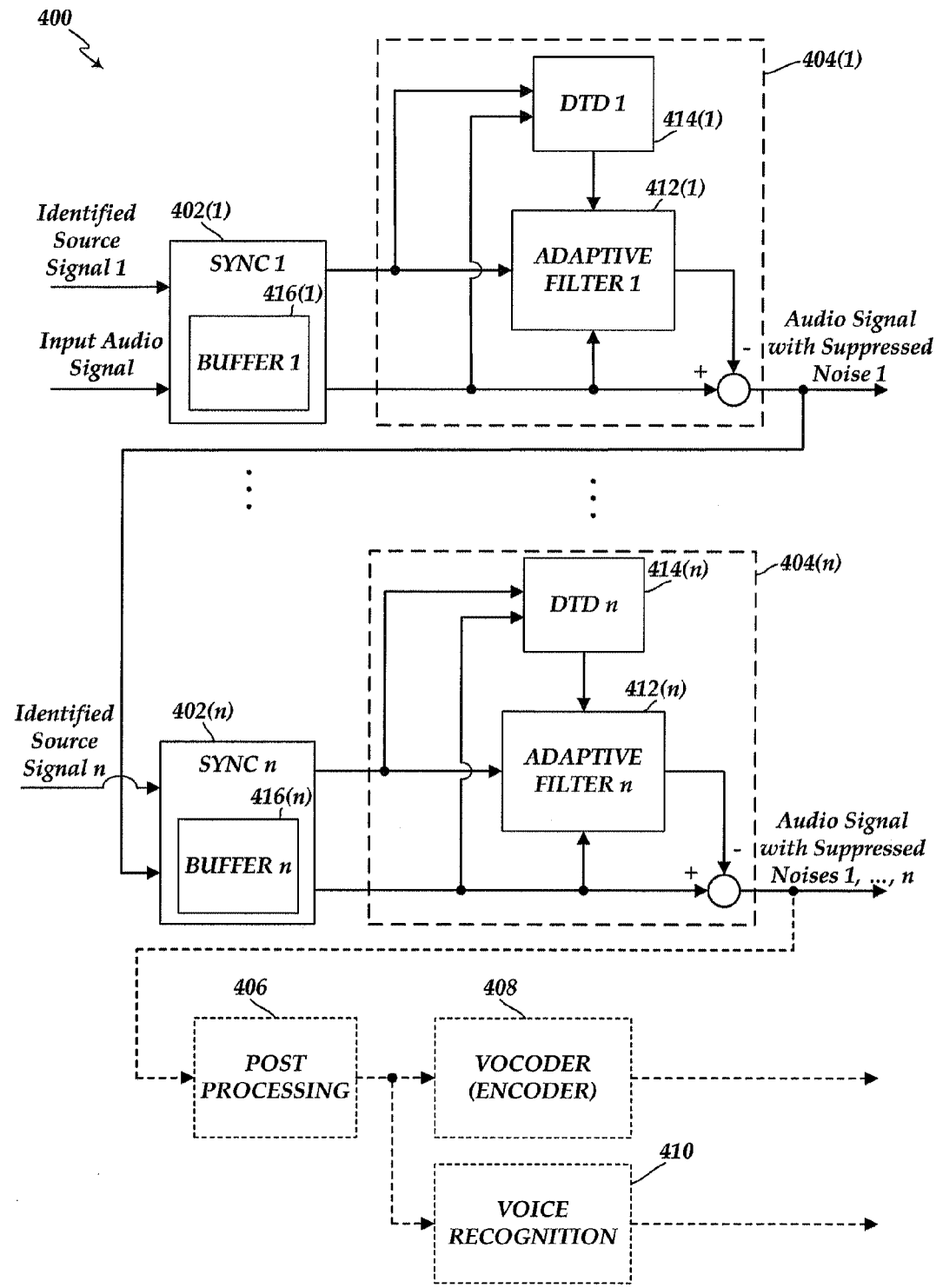
FIG. 4 is a block diagram of a particular illustrative embodiment of an audio canceller system implemented by the audio processing device of FIG. 2.

FIG. 4 shows a block diagram of a particular illustrative embodiment of an audio canceller system 400 implemented by the audio processing device 202 of FIG. 2. As shown, the audio canceller system 400 can be used to suppress multiple audio noise sources. For instance, the audio canceller system 400 has n synchronization blocks 402(1)-402(n) (also called "signal synchronizers") and n corresponding audio cancellers 404(1)-405(n), as well as optional post-processing 406, vocoder 408, and voice recognition 410 blocks. The audio canceller system 400 can be implemented with computer executable instructions, such as the instructions of the audio canceller module 218, executed by the processor 204.

In operation, the audio canceller system 400 receives the input audio signal and n identified source signals, one for each of n possible audio noises to be attenuated. For example, with reference to FIG. 1, audio noise 1 can correspond to audio 120 from the network-enabled TV 116, and audio noise 2 can correspond to audio 122 from the radio 118. Moreover, each identified source signals can correspond to a source signal generated by, for example, the audio signal analyzer 300 of FIG. 3. The n pairs of synchronization block 402(1)-402(n) and audio canceller block 404(1)-404(n) are configured in series such that audio noise 1 is suppressed first, and the resultant processed input audio signal is fed to the audio canceller 2 to suppress the audio noise 2, and so on. It will be appreciated that other applicable configurations can be selected, such as n parallel audio cancellers 404(1)-404(n).

As stated, the n identified source signals can be provided by n separate source transmitters, such as the one shown in FIG. 3. Additionally or alternatively, the n identified source signals can be generated by the separate media device producing the audio noise. The n identified source signals (as well as the input audio signal) can each be provided as PCM audio samples or data packets. For example, in one embodiment the n identified source signals are transmitted as coded voice packets and the audio canceller system 400 includes optional vocoders/decoders (not shown) for decoding the signals before providing the signals to the synchronization blocks 402(1)-402(n).

As shown in FIG. 4, each of the audio cancellers 404(1)-404(n) is associated with a synchronization block 402(1)-402(n), respectively. Each of the synchronization blocks 402(1)-402(n) can synchronize the input audio signal (or the output of the previous audio canceller) and the corresponding identified source signal. The synchronization blocks 402(1)-402(n) can compensate for timing differences due to processing, communication, and the like sources of delays. Further, the synchronization blocks 402(1)-402(n) can be used to compensate in errors in determining or estimating the current temporal location of the source that is being played by the media device. Each of the synchronization blocks 402(1)-402(n) can have a corresponding data buffer 416(1)-416(n), respectively, for providing a delay for synchronization. The delay can be tunable in some embodiments. In operation, the tunable delay can be determined by performing a calibration process. Non-limiting examples of processes for calibrating and tuning the delays can be found in U.S. Provisional Patent Application No. 61/681,474, filed on Aug. 9, 2012.

Each of the n audio cancellers 404(1)-404(n) can have one or more adaptive filters 412(1)-412(n), respectively, configured to filter the corresponding source signal. Filtering can be used to account for variations between the captured audio noise and the source signal. That is, the audio noise captured by the microphone 206 may vary from the source signal because of a number of factors, including the dynamics of the acoustical space (for example, echoes and acoustic dampening, which can vary with microphone 206 and media device locations), dynamics of the speaker/microphone, variations in the content sources (for example, different recording qualities), and the like.

To compensate for these variations, each of the adaptive filters 412(1)-412(n) can have one or more tunable filter parameters. In some embodiments, the filter parameters can be tuned online to model these variations based on the input audio signal and the source signal. For example, when the input audio signal includes, in large part, the sound generated by the media device 1, the error between the output of the adaptive filter 412(1) (the "filtered source signal") and the input audio signal can be used to tune the filter parameters in a manner to reduce the error between the signals. Small error can indicate that the adaptive filter 412(1) is approximately modeling the acoustical effects that modify the audio noise signal, whereas large error indicates that the adaptive filter 412(1) is not modeling the acoustical effects. A variety of methods such as "adaptive laws" or "update rules" can be used to adjust the filter coefficients. Examples include adaptive laws based on a gradient method, such as those based on reducing an instantaneous or integral cost, to adjust the tunable filter parameters to reduce the error between the filtered source signal and the input audio signal. Other examples include a least-mean-square method, a Lyapunov/stability method, and stochastic methods. However, it will be appreciated that any suitable recursive, non-recursive, or batch adaptive law can be used to adjust the tunable filter parameters.

In operation, the audio canceller 404(1) receives synchronized copies of the input audio signal and the identified source signal 1. A stated, the identified source signal 1 can approximate the audio signal driving a speaker that is generating the audio noise. The adaptive filter 412(1) can filter the identified source signal to account for acoustical dynamics of the acoustic space, thereby generating a filtered source signal 1 that approximates the audio noise 1 captured by the microphone 206. The audio canceller 404(1) compares the synchronized input audio signal to the filtered source signal 1 to attenuate or suppress audio noise 1. As shown, audio canceller 404(1) subtracts the filtered source signal from the input audio signal. The audio signal with suppressed noise 1 is then fed to the second synchronization block to suppress audio noise 2, and so on, until the n audio noises have been suppressed from the input audio signal.

Additionally, each adaptive filter 412(1)-412(n) can optionally have a double talk detector ("DTD") 414(1)-414(n), respectively, to stop or enable adjustment of its filter parameter under certain circumstances. When the input audio signal (or output of the previous audio canceller) includes other near-end signals (such as the user's voice or other media noises) in addition to the corresponding audio noise, the corresponding adaptive filter 412(n) may not adapt properly. Because the adaptive filter 412(n) may be adapting when additional near-end signals other than the audio noise are present, those additional near-end signals may act as strongly uncorrelated noise with respect to the adaptive law. Thus, the presence of additional near-end signals may cause the adaptive filter 412(n) to diverge and allow unsuppressed audio noise. Accordingly, each of the DTDs 414(1)-414(n) may be used to monitor the input of the corresponding adaptive filter 412(1)-412(n) and stop or enable adaptation based on the detection of additional near-end signals.

One such method of the DTDs 414(1)-414(n) may involve calculating a double-talk detection statistic to determine when the adaptive filter input signal includes additional near-end signals. One example double-talk detection statistic is given by the ratio of the source signal power to the corresponding adaptive filter input signal. Other applicable doubletalk-detection statistics can be selected. Furthermore, the double-talk statistic may be computed in the time domain or in the frequency domain.

As shown in FIG. 4, an optional non-linear post-processing block 406 can optionally be included to perform certain types of processing on the signal provided by the echo canceller 404(n). For example, the non-linear post-processing block 406 may remove the residual noise (for example, a non-linear component of the audio noise signal) from the signal leaving the echo canceller 404(n). In some embodiments, the non-linear noise component can be removed or attenuated by estimating the non-linear component of the input audio signal and then subtracting (for example, by using spectral subtraction techniques) the estimate from the input audio signal. The non-linear post processing block may operate based on the double-talk decisions from the DTDs 414(1)-414(n). Hence, the double-talk decisions help differentiate between the near-end signal and residual audio noise before the non-linear post processor 204 clips or removes the signal completely.

The audio signal with suppressed noises 1, . . . , n may be provided to a vocoder 408 to encode the audio signal into voice packets. Additionally or alternatively, audio signal with suppressed noises may be provided to a voice recognition block 410 for further audio signal processing.

The number n of audio cancellers 404(1)-404(n) can be selected based on various considerations, such as expected noise environments, computing power, real-time constraints, memory, performance, and/or the like considerations. It will be appreciated, however, that other applicable factors can be considered. Likewise, it will be appreciated that the audio canceller system can include any applicable number of synchronization blocks. In some embodiments, the number of these components can vary dynamically with respect to the number of identified noise components as discussed below in connection with FIG. 5.

Figure 5:
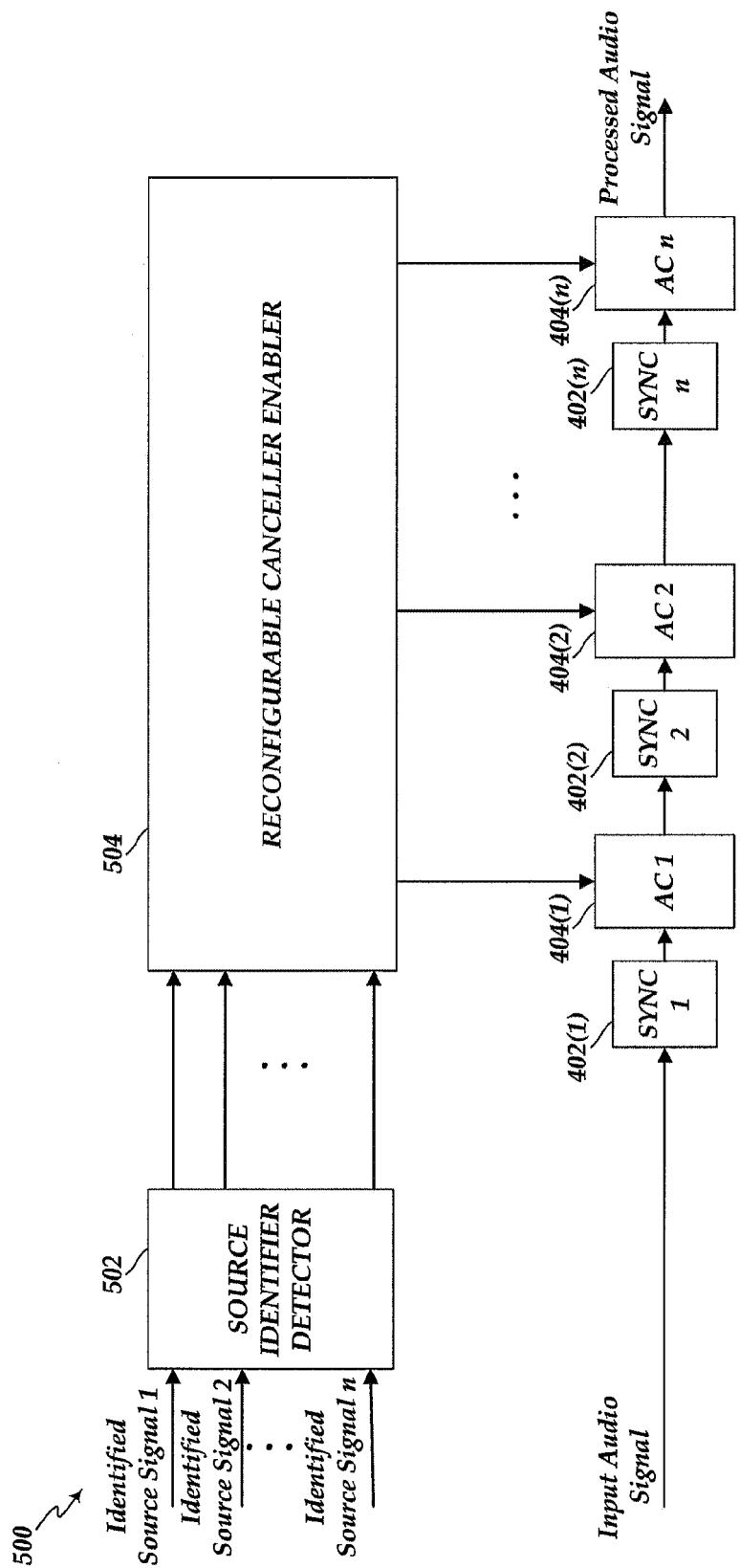
FIG. 5 is a block diagram of another particular illustrative embodiment of an audio canceller system implemented by the audio processing device of FIG. 2.

FIG. 5 shows a block diagram of another particular illustrative embodiment of an audio canceller system 500 implemented by the audio processing device 202 of FIG. 2. Elements common to the systems 400, 500 of FIGS. 4 and 5 share common reference indicia, and only differences between the systems 400, 500 are described herein for the sake of brevity.

The audio canceller system 500 has n synchronization blocks 402(1)-402(n), n audio canceller blocks 404(1)-404(n), a source identifier detector 502, and a reconfigurable canceller enabler 504. The source identifier detector 502 receives n identified source signals to determine which of the identified source signal paths are active. For example, the source identifier detector 502 can determine active source signal paths based on the presence of a signal or the level of the energy of the corresponding signal on that path. In turn, the reconfigurable canceller enabler 504 activates the audio canceller blocks 404(1)-404(n) corresponding to active identified source signal paths. Each active audio canceller block of the audio canceller blocks 404(1)-404(n) can operate as described above in connection with FIG. 4. Each inactive audio canceller block of the audio canceller blocks 404(1)-404(n), for example, can be configured as a pass-through filter.

Figure 6:
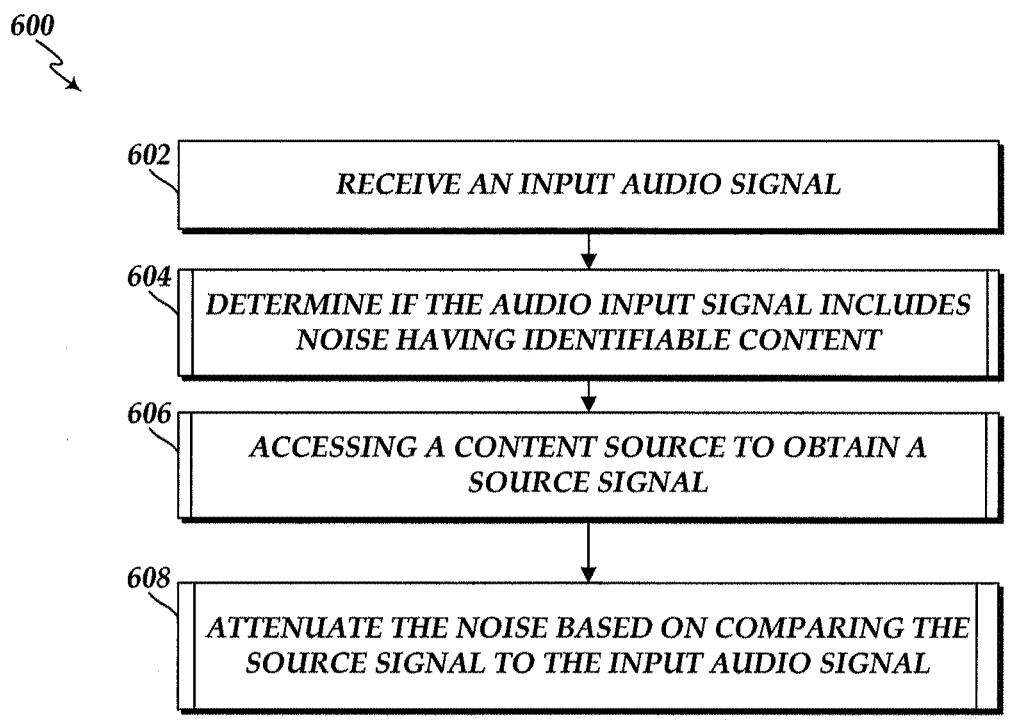
FIG. 6 is a flow diagram of a method of audio noise suppression according to various embodiments.

FIG. 6 shows a flow diagram of a method 600 of audio noise suppression according to one embodiment. While the description of the methods which follow focuses on implementation on a personal audio processing device 202, such as a mobile phone, personal audio player, other devices may be configured to perform the method or a variant thereof. The methods can be implemented as a software module or collection of modules residing with the non-transitory computer storage, such as RAM, ROM, a hard disk drive, or the like, of a computing device associated with the audio processing device 202. One or more processors of the computing device can execute the software module.

In block 602, the method 600 includes receiving an input audio signal. For example, the audio processing device 202 may receive the input audio signal from the microphone 206 of the audio processing device 202, from the data storage device 210 or the memory 212 device, or received at the communication interface 208.

After the input audio signal is received at block 602, the process 600 moves to block 604 wherein a determination is made if the audio input signal includes noise having identifiable content. For example, in one embodiment the audio processing device 202 may execute instructions from the audio signal analyzer module 216 to determine feature information of the audio input signal that may be used to identify the content of the audio noise. The feature information can be used by the content identifier 308 to determine content identification information. In one embodiment, the audio processing device 202 can send the feature information to a server over a network for further processing and then receive the content-identification information over the network. In another embodiment, one or more of the functions of the content identifier 308 and source searcher 312 blocks can be performed on the audio processing device 202 to determine content-identification information. One embodiment of a method for implementing the operation of the block 604 is described below in connection with FIG. 7A.

In another embodiment, the operation of the block 604 is performed by the executing instructions from the audio signal analyzer module 216 to communicate with a separate media device to determine if the audio input signal has identifiable content. For example, the audio processing device 202 can request information from the separate media device regarding whether media device is playing audio media and, if so, content-identification information. In response, the audio processing device 202 may receive content-identification information.

Once the determination is made that the audio input signal contains background noise having identifiable content, the method 600 moves to block 606 to access a content source of the identifiable content to obtain a source signal. For example, in one embodiment the audio processing device 202 may access the content source or the content source signal via the communication interface 208 or via the memory 212 or data storage device 210. For example, the content-identification information obtained in block 604 can be used to locate and access a content source. The content source can be used to generate a source signal. One embodiment of a method for implementing the operation of the block 606 is described below in connection with FIG. 7B.

After at least a portion of the source signal is available, the method 600 proceeds to block 608 wherein the noise is attenuated based on comparing the source signal to the input audio signal. For example, in one embodiment the audio processing device 202 executes instructions of the audio canceller module 218 in memory 212 to attenuate the audio noise in accordance with the audio canceller system shown in FIG. 4 or 5.

Figure 7A:
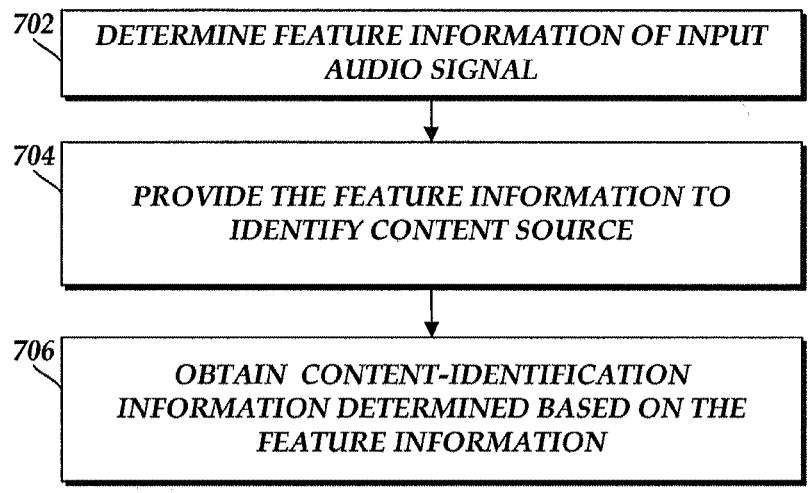
FIG. 7A is an illustrative flow diagram of an example method for determining if the audio input signal includes noise having identifiable content according to one embodiment.

Now turning to FIG. 7A, an illustrative flow diagram of an example of the steps undertaken in the block 604 for determining if the audio input signal includes noise having identifiable content according to one embodiment is shown. In block 702, the method 604 determines feature information of the input audio signal. For example, in one embodiment the audio processing device 202 executes instructions of the audio signal analyzer module 216 in memory 212 to extract features in accordance with the feature extractor 306 shown in FIG. 3. Once sufficient feature information has been determined, the process 604 then moves to block 704 to provide the feature information to identify the content source. For example, in one embodiment the audio processing device 202 executes instructions of the audio signal analyzer module 216 in memory 212 to cause the communication interface 208 to transmit the feature information to a server device over a network for processing by the server device.

After providing the feature information, the method 604 proceeds to block 706 for obtaining content-identification information. For instance, the audio processing device 202 can receive the content-identification information from the server device that received the feature information in performing block 704. Alternatively or additionally, in some embodiments, the audio processing device 202 generates the content-identification information by performing the necessary steps on the processing device 202 instead of communicating with a server device. For example, the processor 204 of the audio processing device 202 can execute instructions of the audio signal analyzer module 216 in memory 212 to implement the audio signal analyzer 300 of FIG. 3.

Figure 7B:
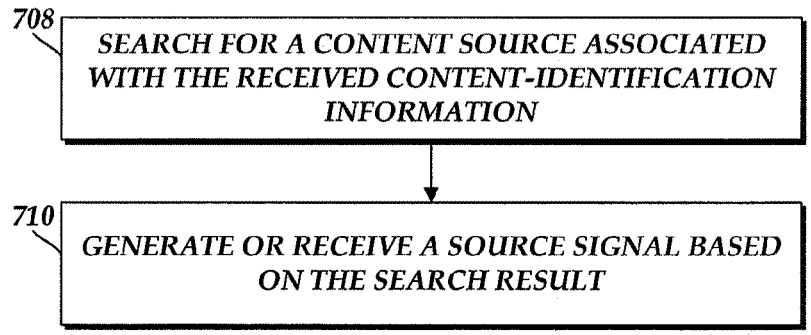
FIG. 7B is an illustrative flow diagram of an example method for accessing a content source to obtain a source signal according to one embodiment.

FIG. 7B is an illustrative flow diagram of an example method 606 for accessing a content source to obtain a source signal according to one embodiment. In block 708, the method 606 includes searching for a content source associated with the received content-identification information. For example, in one embodiment the audio processing device 202 executes instructions of the audio signal analyzer module 216 in memory 212 to search a media library stored in the data storage device 210. After searching, the method 606 proceeds to block 710 for generating or receiving a source signal based on the search result. For example, if the content source is found locally on the audio processing device 202, the processor 204 executes instructions to generate a source signal from the content source. If the content source is not found locally on the device, in one embodiment the audio processing device 202 executes instructions of the audio signal analyzer module 216 in memory 212 to request and receive the identified source signal from the content databases 110 over the network 108.

Figure 8:
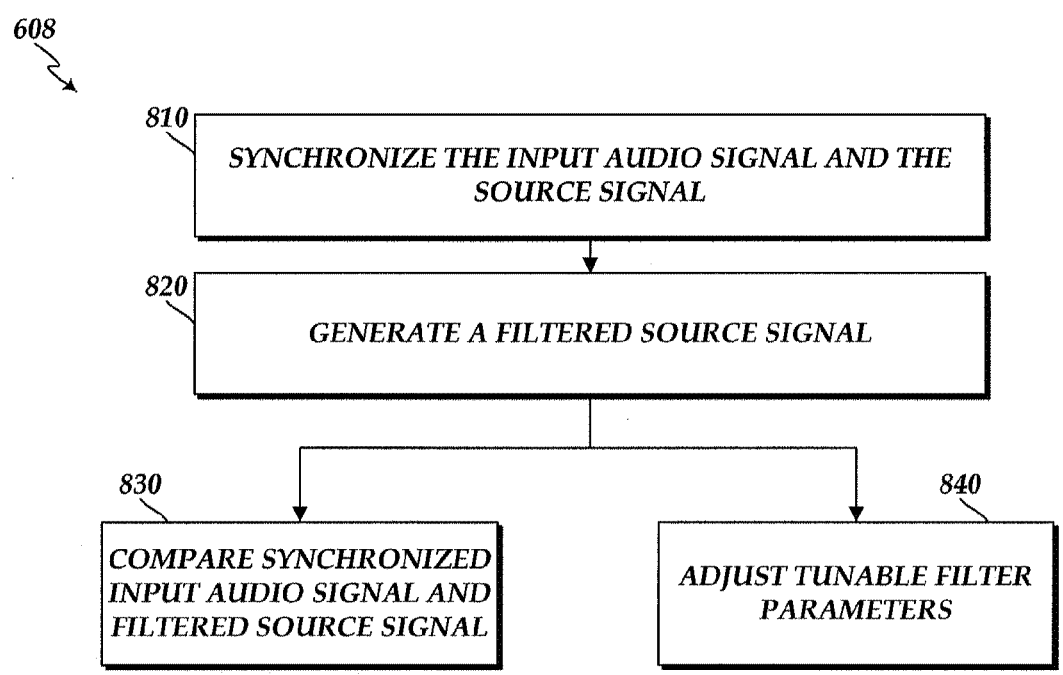
FIG. 8 is an illustrative flow diagram of an example method for attenuating the audio noise according to an embodiment.

Now turning to FIG. 8, an illustrative flow diagram of an example of the steps undertaken in the block 608 for attenuating the audio noise according to an embodiment is shown. In block 810, the input audio signal and the source signal are synchronized to compensate for time delays between the two signals. In operation, the signals can become out of sync for a variety of reasons, including the various delays resulting from taking different signal and computational paths. To synchronize the signals, each signal can be stored in a data buffer (such as a circular buffer) of variable length so as to control the timing of each signal. For example, with reference to FIG. 4, the input audio signal and the identified source signal may be received at the first synchronization block 402(1). The synchronization block 402(1) can store the signals in corresponding circular buffers data structures stored in the buffer block 416(1), where the lengths of the circular buffers can be a function of the desired delay for synchronizing the signals. In some embodiments the desired delay is calculated or estimated, for example, during a calibration mode. As the input audio signal is processed by the n audio cancellers 404(1)-404(n), additional delays in the audio signal can occur at each of the n audio cancellers 404(1)-404(n). For example, filtering by n adaptive filters 412(1)-412(n) the can introduce delays. Additionally, the n identified source signals can experience various delays due to, for example, the time that it takes to identify and ultimately receive the identified source signals. Accordingly, the n synchronization blocks 402(1)-402(n) can be used to compensate for those various delays and maintain the audio signal and the identified source signals synchronized during audio-cancelling processing.

After the audio input signal and the identified source signal are synchronized, the method 608 continues to block 820 to filter the identified source signal to account for the acoustical effects impacting the audio noise, such as acoustical dynamics, speaker and microphone dynamics, and the like. Filtering is done because the identified source signal may not accurately represent the audio noise that is captured by the microphone 206. If the identified source signal substantially varies from the audio noise, audio suppression may not be effective. To improve noise suppression, the effects of such factors can be estimated online in order to shape the identified source signal to closely match or replicate the audio noise. For example, referring now to FIG. 4, the synchronized audio input signal and the synchronized identified source signal 1 are passed to the audio noise canceller 404(1) and to adaptive filter 412(1). The adaptive filter 412(1) can then filter or shape the identified source signal 1 to produce a reference signal to approximately replicate the audio noise. The adaptive filter 412(1) can have one or more filter parameters (for example, one or more filter coefficient of a finite impulse response of infinite impulse response filter) that influences how the filter shapes the identified source signal. Some embodiments include tunable parameters to account for a wide range of acoustical effects.

After synchronizing and filtering the identified source signal, the method 608 can proceed to block 830 to generate a processed audio signal by comparing the synchronized audio input and the filtered source signal. In one embodiment, the filtered source signal is subtracted from the synchronized audio input signal. To illustrate, FIG. 4 shows that the output of the adaptive filter 412(1) is subtracted from the audio input signal to generate the audio signal with suppressed noise 1. In one embodiment, the audio signal with suppressed noise 1 can be processed for communication or voice recognition applications. In another embodiment, the audio signal with suppressed noise 1 can be processed for further noise suppression. For example, FIG. 4 shows that the processed audio signal with suppressed noise 1 can be provided to synchronization blocks 402(2)-402(n) and audio cancellers 404(2)-404(n) to suppress additional noises 2-n with identified source signals 2-n.

Optionally, the method 608 can proceed to block 840 after performing block 820 to adjust the tunable filter parameters of the adaptive filter 412(1) to improve noise suppression with respect to a wide range of acoustical effects. In one embodiment the adjustment of the tunable filter parameters is governed by an adaptive law or update law. For example, with reference to FIG. 4, the adaptive filter 414(1) receives both the synchronized audio input signal and the identified source signal. The adaptive filter 414(1) can generate the filtered source signal. An "error signal" or "repressor signal" can be generated by comparing the audio input signal and the filtered source signal. The error signal can indicate how closely the adaptive filter is replicating the audio noise. For example, if the audio input is composed substantially of the audio noise, then the difference between the synchronized audio input signal and filtered source signal indicates the amount of mismatch between the filtered identified source signal and the audio noise. That is, a small error indicates that the adaptive filter is closely modeling the actual acoustic dynamics in the room. The adaptive law can be chosen (for example, based on a gradient or recursive least mean squares, or the like methods) to adjust the tunable filter parameters of the adaptive filter 412(1) in a manner that reduces the error signal.

However, when the audio input signal is not composed substantially of the audio noise corresponding to the identified source signal 1, the adaptive filter 414(1) may not adjust its tunable parameters properly. For example, the audio signal could contain the user's voice commands or audio noise from a second source. In this situation the error signal may not provide a meaningful indication of how closely the adaptive filter is matching, for example, the room acoustics with respect to audio noise 1. Accordingly, the DTD 414(1) block may turn off adjustment of the adaptive filter when the DTD block detects such a condition, as previously stated in connection with FIG. 4.

As stated, the steps of synchronization and filtering can be performed using n identified source signals to cancel n audio noises. With reference to FIG. 4, in particular, the audio noises are cancelled sequentially. However, in some embodiments the noises can be canceled in parallel.

Figure 9:
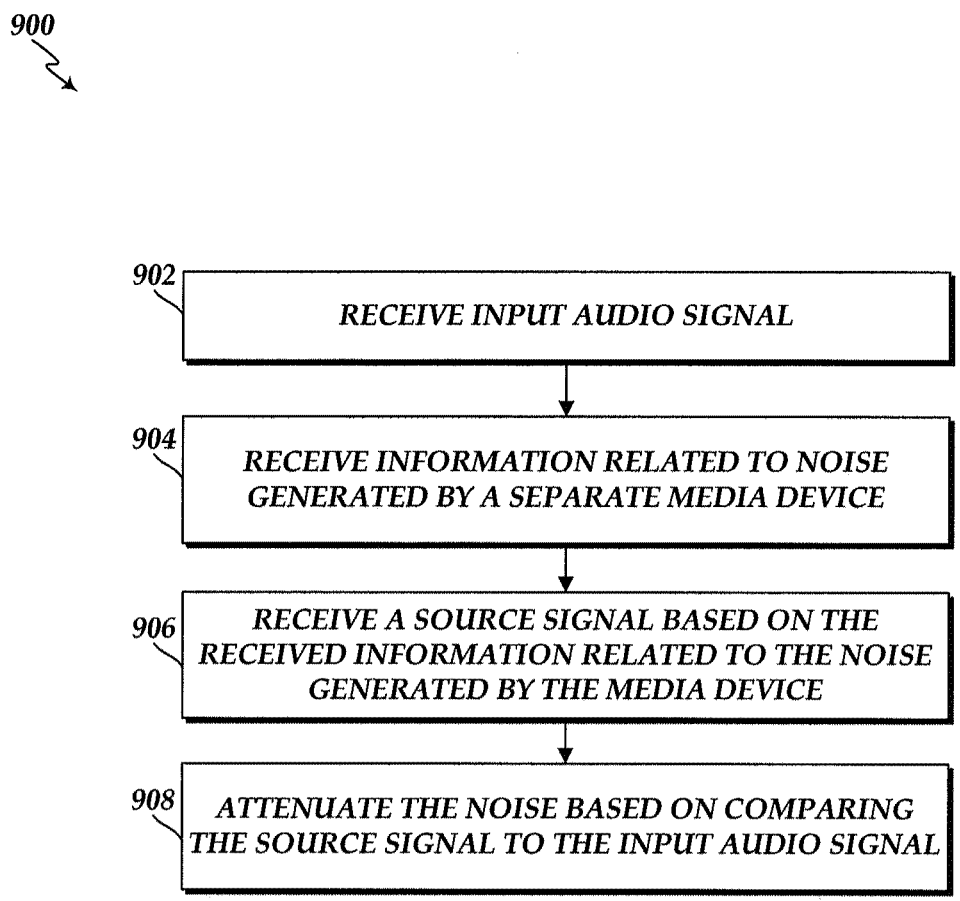
FIG. 9 is a flow diagram of a particular illustrative method of audio noise suppression according to an embodiment.

FIG. 9 is a flow diagram of a particular illustrative method 900 of audio noise suppression according to an embodiment. In block 902, the method 900 includes receiving the input audio signal. Block 902 can be performed as described in connection with FIG. 6. After receiving at least a portion of the audio input signal, the method 900 proceeds to block 904 for receiving information related to the noise generated by a separate media device. For example, the audio processing device 202 can communicate with the separate media device by executing instructions from the audio signal analyzer module 216 and the communication module 220, as discussed in connection with FIG. 2. The separate media device may provide the audio processing device 202 an indication of whether or not the separate media device is generating noise having media content. Additionally or alternately, the separate media device can communicate content-identification information, which the audio processing device 202 may use to search for a content source. An example of content-identification information includes the TV channel, radio frequency, and like media broadcast selection information. In one embodiment, the separate media device may send a source signal to the audio processing device 202.

After the audio processing device 202 receives information related to the noise, the method 900 proceeds to block 906 for receiving a source signal based on the received information related to the noise generated by the separate media device. For example, if the audio processing device receives an indication from the separated media device that the media device is generating noise, or if the audio processing device 202 receives content-identification information, then the audio processing device 202 can receive a source signal by performing the methods 604 and 606 of FIGS. 6, 7A, and 7B as described above. In some embodiments, the audio processing device 202 receives the source signal from the separate media device. For example, the separate media device can transmit a copy of the media that the separate media device is playing.

After receiving the source signal, the method 900 can proceed to block 908 for attenuating the noise based on comparing the source signal to the input audio signal. For example, the audio processing device 202 attenuate the audio noise by performing the method 608 of FIGS. 6 and 8 as described above.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as the AMD® Athlon® II or Phenom® II processor, Intel® i3®/i5®/i7® processors, Intel Xeon® processor, or any implementation of an ARM® processor. In addition, the processor may be any conventional special purpose processor, including OMAP processors, Qualcomm® processors such as Snapdragon®, or a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be written in any conventional programming language such as C#, C, C++, BASIC, Pascal, or Java, and run under a conventional operating system. C#, C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A device to attenuate audio noise, the device comprising:
a microphone configured to receive an input audio signal;
an audio signal analyzer configured to determine whether the input audio signal includes at least a noise signal having identifiable content and an audio signal, wherein if the noise signal has identifiable content, the audio signal analyzer is further configured to access a content source to obtain a copy of the noise signal; and
an audio canceller configured to generate a processed audio signal by (i) comparing the obtained copy of the noise signal to the input audio signal to generate at least one filter and (ii) applying the at least one filter to the input audio signal to attenuate the audio signal.

2. The device of claim 1, wherein the audio signal analyzer is configured to perform the determination of whether the input audio signal includes the noise signal having identifiable content for noise signals generated by separate media devices.

3. The device of claim 1, further comprising a communication interface, wherein the audio signal analyzer is further configured to:
determine feature information of the input audio signal;
using the communication interface, transmit the feature information; and
using the communication interface, receive the copy of the noise signal based at least on transmitting the feature information.

4. The device of claim 3, wherein the audio signal analyzer is further configured to:
receive, via the communication interface, content-identification information in response to providing the feature information;
search the device for the content source based on matching the received content-identification information with the content source; and
generate the copy of the noise signal from the content source if the search results in matching the content source.

5. The device of claim 1, wherein the audio signal analyzer comprises:
a feature extractor configured to determine feature information of the input audio signal;
a content identifier configured to determine content-identification information associated with the feature information;
a source searcher configured to search a database for the content source based on matching the content-identification information to the content source; and
a source transmitter configured to generate the copy of the noise signal from the content source if the search locates the content source.

6. The device of claim 1, further comprising a signal synchronizer configured to delay at least one of the input audio signal and the copy of the noise signal, wherein the audio canceller includes:
an adaptive filter having a tunable filter parameter, the adaptive filter configured to generate a filtered noise signal based on a synchronized copy of the noise signal and the tunable filter parameter, the adaptive filter being configured to adjust the tunable filter parameter based on comparing the synchronized input audio signal and the synchronized copy of the noise signal; and
a double talk detector of the adaptive filter configured to disable adjustment of the tunable filter parameter of the adaptive filter when the double talk detector detects that the input audio signal has the audio signal in addition to the copy of the noise signal,
wherein the audio canceller compares the copy of the noise signal to the input audio signal by comparing the filtered noise signal to the synchronized input audio signal.

7. The device of claim 1, further comprising a communication module configured to communicate data on a communication channel between the device and a separate media device, wherein the communication module receives at least a portion of the copy of the noise signal from the separate media device.

8. The device of claim 1, further comprising a communication module configured to communicate data on a communication channel between the device and a separate media device, wherein the communication module receives content-identification data corresponding to the content source.

9. A method to attenuate audio noise, the method comprising:
receiving an input audio signal;
determining whether the input audio signal includes at least a noise signal having identifiable content and an audio signal;
if the noise signal has identifiable content, accessing a content source to obtain a copy of the noise signal; and
generating a processed audio signal by (i) comparing the obtained copy of the noise signal to the input audio signal to generate at least one filter and (ii) applying the at least one filter to the input audio signal to attenuate the audio signal.

10. The method of claim 9, wherein the step of determining whether the input audio signal includes the noise signal having identifiable content comprises determining whether the input audio signal includes a noise signal generated by a separate media device and having identifiable content.

11. The method of claim 9, wherein the step of determining whether the input audio signal includes the noise signal having identifiable content comprises:
   determining feature information of the input audio signal; and
   transmitting the feature information,
   wherein the step of accessing the copy of the noise signal includes receiving the copy of the noise signal based at least on transmitting the feature information.

12. The method of claim 11, wherein the step of determining of whether the input audio signal includes the noise signal having identifiable content comprises:
   receiving content-identification information in response to providing the feature information;
   searching the device for the content source based on matching the received content-identification information with the content source; and
   generating the copy of the noise signal from the content source if the search results in matching the content source.

13. The method of claim 9, wherein the step of determining of whether the input audio signal includes the noise signal having identifiable content comprises:
   determining feature information of the input audio signal;
   determining content-identification information associated with the feature information;
   searching a database for the content source based on matching the content-identification information to the content source; and
   generating the copy of the noise signal from the content source if the search locates the content source.

14. The method of claim 9, further comprising delaying at least one of the input audio signal and the copy of the noise signal to synchronize the input audio signal and the copy of the noise signal, wherein the step of generating the processed audio signal includes:
   using an adaptive filter having a tunable filter parameter to generate a filtered noise signal based on a synchronized copy of the noise signal and, the tunable filter parameter;
   selectively adjusting the tunable filter parameter based on comparing the synchronized input audio signal and the synchronized copy of the noise signal; and
   determining whether the input audio signal has the audio signal in addition to the noise signal;
   disabling adjustment of the tunable filter parameter of the adaptive filter when it is determined that the input audio signal has the audio signal in addition to the noise signal, wherein the comparing the copy of the noise signal to the input audio signal by comparing the noise signal to the input audio signal includes comparing the filtered noise signal to the synchronized input audio signal.

15. The method of claim 9, further comprising communicating data on a communication channel with a separate media device to receive at least a portion of the copy of the noise signal from the separate media device.

16. The method of claim 9, further comprising communicating data on a communication channel to a separate media device to receive content-identification data corresponding to the content source.

17. A non-transitory, computer-readable medium storing instructions that, when executed, causes a processor to perform a method comprising of:
   receiving an input audio signal;
   determining whether the input audio signal includes at least a noise signal having identifiable content and an audio signal;
   if the noise signal has identifiable content, accessing a content source to obtain a copy of the noise signal; and
   generating a processed audio signal by (i) comparing the obtained copy of the noise signal to the input audio signal to generate at least one filter and (ii) applying the at least one filter to the input audio signal to attenuate the audio signal.

18. The non-transitory, computer-readable medium of claim 17, wherein the instructions, when executed, perform a method further comprising:
   determining feature information of the input audio signal;
   transmitting the feature information by using a communication interface; and
   receiving the copy of the noise signal based at least on transmitting the feature information by using the communication interface.

19. An apparatus to attenuate audio noise, the apparatus comprising:
   means for receiving an input audio signal;
   means for determining whether the input audio signal includes at least a noise signal having identifiable content and an audio signal, and for selectively accessing a content source to obtain a copy of the noise signal if the noise signal has identifiable content; and
   means for generating a processed audio signal by (i) comparing the obtained copy of the noise signal to the input audio signal to generate at least one filter and (ii) applying the at least one filter to the input audio signal to attenuate the audio signal.

20. The apparatus of claim 19, wherein the means for determining includes:
   means for determining content-identification information associated with feature information of the input audio signal;
   means for searching a database for the content source based on matching the content-identification information to the content source; and
   means for generating the copy of the noise signal from the content source if the search locates the content source.

* * * * *